(12) United States Patent
Ghatage et al.

(10) Patent No.: US 10,776,717 B2
(45) Date of Patent: Sep. 15, 2020

(54) LEARNING BASED ROUTING OF SERVICE REQUESTS

(71) Applicant: Accenture Global Solutions Limited, Dublin (IE)

(72) Inventors: Prakash Ghatage, Bangalore (IN); Madhura Shivaram, Bangalore (IN); Kaushal Mody, Mumbai (IN); Nirav Sampat, Mumbai (IN); Samatha Kottha, Bangalore (IN); Sumeet Sawarkar, Thane West (IN); Suraj Jadhav, Navi Mumbai (IN); Madhu Sudhan H V, Mysore (IN); Nagendra B. Kumar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 716 days.

(21) Appl. No.: 15/622,285

(22) Filed: Jun. 14, 2017

(65) Prior Publication Data

US 2017/0372231 A1    Dec. 28, 2017

(30) Foreign Application Priority Data

Jun. 23, 2016 (IN) .............................. 201641021571

(51) Int. Cl.
*G06N 5/02* (2006.01)
*G06N 20/00* (2019.01)
(Continued)

(52) U.S. Cl.
CPC ............. *G06N 20/00* (2019.01); *G06F 16/35* (2019.01); *G06F 40/263* (2020.01); *G06F 40/58* (2020.01);
(Continued)

(58) Field of Classification Search
CPC ................................. G06N 20/00; G06N 5/02
(Continued)

(56) References Cited

U.S. PATENT DOCUMENTS

2014/0351176 A1* 11/2014 Jan ......................... G06N 5/048
706/12
2015/0039292 A1    2/2015 Suleman et al.
(Continued)

FOREIGN PATENT DOCUMENTS

WO    WO 2010/053701    5/2010

OTHER PUBLICATIONS

Australian Office Action for Application No. 2017203826, dated Oct. 17, 2017, 5 pages.

*Primary Examiner* — David R Vincent
(74) *Attorney, Agent, or Firm* — Fish & Richardson P.C.

(57) ABSTRACT

Techniques are described for routing service requests in a computer-implemented service environment. A received service request may be initially analyzed to determine a priority of the request. In some implementations, one or more actions may be automatically performed to provide an initial response to the requester. The text of the request may be analyzed to automatically determine a category of the request. In some implementations, a classification engine may determine the category of the request through use of a classification model that has been trained using one or more machine learning (ML) techniques and/or that employs Natural Language Processing (NLP). Based on the category, the request may be routed to agent(s) for handling. Routing may include generating a ticket that includes the request, the category, the priority, and/or other information, and the ticket may be provided to the appropriate agent(s) through a ticketing service.

20 Claims, 5 Drawing Sheets

(51) Int. Cl.
*G06F 16/35* (2019.01)
*G06F 40/58* (2020.01)
*G06F 40/263* (2020.01)
*G06Q 10/06* (2012.01)
*G06Q 10/10* (2012.01)
*G10L 15/26* (2006.01)

(52) U.S. Cl.
CPC ......... *G06Q 10/0631* (2013.01); *G06N 5/025* (2013.01); *G06Q 10/10* (2013.01); *G10L 15/26* (2013.01)

(58) Field of Classification Search
USPC ..................................................... 706/15, 45
See application file for complete search history.

(56) References Cited

U.S. PATENT DOCUMENTS

| | | | |
|---|---|---|---|
| 2016/0117628 A1* | 4/2016 | Brophy | G06F 40/58 704/2 |
| 2017/0212756 A1* | 7/2017 | Ryali | G06F 8/60 |
| 2018/0053114 A1* | 2/2018 | Adjaoute | G06Q 20/4016 |

* cited by examiner

LEARNING BASED ROUTING OF SERVICE REQUESTS

CROSS-REFERENCE TO RELATED APPLICATION

This application claims priority to Indian Provisional Patent Application No. 201641021571, filed on Jun. 23, 2016, entitled "LEARNING BASED ROUTING OF SERVICE REQUESTS," the entirety of which is hereby incorporated by reference.

BACKGROUND

An organization may use any number of computing systems, communications networks, data storage devices, or other types of systems to provide services to individuals. An organization may also employ service representatives, agents, or other personnel that use the various systems to assist individuals in resolving service requests received through various communication channels. An organization may seek to optimize the manner in which incoming service requests are routed to service representatives to ensure optimal usage of computing resources, to provide an appropriate level of responsiveness to the individuals who submitted the service requests, and to ensure that the service requests are satisfactorily resolved.

SUMMARY

Implementations of the present disclosure are generally directed to routing service requests. More specifically, implementations are directed to routing service requests in a computer-implemented service environment using an engine and/or a model that is trained through machine learning.

In general, innovative aspects of the subject matter described in this specification can be embodied in methods that include operations of: receiving a request that indicates an issue to be resolved; determining at least one category of the request by applying a classification model to text data of the request, the classification model developed using at least one machine learning (ML) algorithm; determining at least one agent for resolving the issue, the at least one agent determined based at least partly on the at least one category of the request; and communicating the request to at least one agent.

Implementations can optionally include one or more of the following features: the operations further include performing at least one action in response to the request, the at least one action determined by applying at least one rule to the text data of the request; the operations further include determining a priority of the request based at least partly on the text data of the request; the operations further include communicating the priority of the request to the at least one agent; the priority is further based on at least one characteristic of a requestor who submitted the request; the operations further include conditionally performing at least one action in response to the request based at least partly on the priority of the request, the at least one action determined by applying at least one rule to the text data of the request; the request is received as one or more of an email, a text message, or form data; the text data is included in the request; the request is received as audio data; the text data is generated by applying speech-to-text (STT) analysis to the audio data; the operations further include determining at least one natural language of the request; the at least one agent is determined further based on the at least one natural language; the operations further include providing historical data including previous requests and at least one category determined for each of the previous requests; the operations further include developing the classification model using the historical data through application of the at least one ML algorithm; and/or the classification model is further developed using Natural Language Processing.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. In a traditional service environment, front-end agent(s) may read a request and create a ticket directed to the appropriate back-end agent(s) for investigation and resolution. This traditional routing process may be slow and prone to routing errors. By routing requests using a classification model developed through machine learning and Natural Language Processing (NLP), implementations avoid the cost and delay of using front-end agent(s) while providing a routing system that is less prone to routing errors compared to traditional routing systems. Moreover, through ongoing refinement of the classification model, implementations provide a routing system that may improve over time and that may readily accommodate the routing of new categories of requests. Accordingly, implementations reduce the subjectivity in decision making of an agent to route the ticket, and reduce the handling time, and the requestor receives an acknowledgement within minutes of submitting a request irrespective of time zone and hour of the day. Moreover, because implementations route requests in a more accurate manner compared to traditional request routing systems, implementations avoid the expenditure of networking capacity, storage space, memory, processing power, and/or other computing resources that are consumed by traditional systems to recover from erroneously routed requests. Because implementations provide faster and more efficient routing than traditional systems, implementations make more efficient use of computing resources (e.g., network capacity, storage, memory, processing power, etc.) compared to traditional systems.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DETAILED DESCRIPTION

Figure 1:
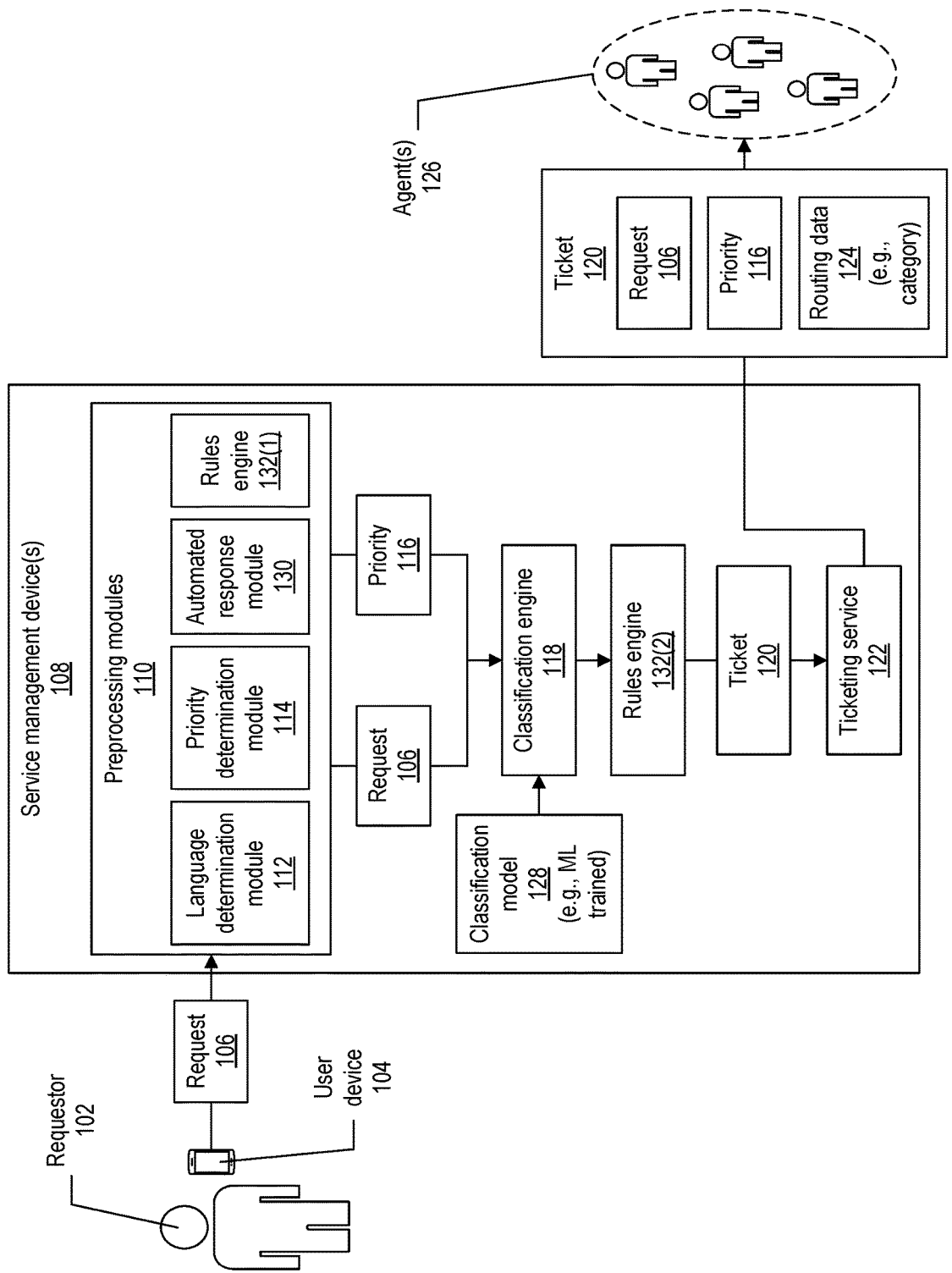
FIG. 1 depicts an example system for routing service requests in a service environment, according to implementations of the present disclosure.

Implementations of the present disclosure are directed to systems, devices, methods, and computer-readable media for routing service requests in a computer-implemented service environment. A received service request may be initially analyzed to determine a priority (e.g., urgency, importance, criticality, etc.) of the request. In some implementations, one or more actions may be automatically performed to provide an initial response to the requester. For example, troubleshooting guidelines may be sent to the requestor in response to a request indicating a problem with computer hardware and/or software. As another example, a request may be submitted for financial, personal, and/or transactional data, to raise a dispute, or for other purposes. The text of the request may be analyzed to automatically determine a category of the request (e.g., a subject matter of the request, what the request is about). In some implementations, a classification engine may determine the category of the request through use of a classification model that has been trained using one or more machine learning (ML) techniques and/or that employs Natural Language Processing (NLP). Based on the category, the request may be routed to one or more service agents to handle the request. In some implementations, routing may include generating a ticket that includes the request, the category, the priority, and/or other information. The ticket may be provided to the appropriate agent(s) through a ticketing service. The agent(s) may perform various action(s) to resolve the request, follow up with the requestor to gather additional information, and/or notify the requestor when the requested problem(s) and/or issue(s) have been resolved.

Implementations employ a ML-based model for routing request(s). Implementations may be used in various types of service environments for routing various types of requests. For example, implementations may operate within an information technology (IT) service environment to route requests that describe problem(s) and/or issue(s) with computer hardware, computer software, computer system management, data storage, networking, account management, and/or other types of IT issues. As another example, implementations may operate within a business or other organization to route requests related to sales, shipments, invoices, customer service, and so forth. In general, implementations may be employed within any suitable type of service environment in which different requests may be routed to different agents, or teams of agents, for resolution.

In a traditional service environment, front-end agent(s) read a request and create a ticket directed to the appropriate back-end agent(s) for investigation and resolution. This traditional routing process may be slow and prone to routing errors. By automating the routing process using a ML-trained classification model, implementations avoid the cost and delay of using front-end agent(s) while providing a routing system that is less prone to routing errors compared to traditional routing systems. Moreover, through ongoing refinement of the classification model, implementations provide a routing system that may improve over time and that may readily accommodate the routing of new categories of requests.

FIG. 1 depicts an example system for routing service requests in a service environment, according to implementations of the present disclosure. A requestor 102 may employ a user device 104 to generate a service request 106. The user device 104 may include any suitable type of computing device, such as a smartphone, tablet computer, wearable computing device, laptop computer, desktop computer, and so forth. The request 106 may be communicated over one or more networks from the user device 104 to one or more service management devices 108. The service management device(s) 108 may include any suitable type and number of computing devices, such as server computers, distributed computing devices (e.g., cloud computing servers), and so forth.

The service management device(s) 108 may execute one or more preprocessing modules 110 that receive the request 106 and perform initial processing of the request 106, as described further below. In some implementations, the preprocessing module(s) 110 may send an acknowledgement message notifying the requestor 102 that their request 106 has been received and will be handled appropriately. The acknowledgement message may include an issue identifier (ID) (e.g., ticket number, ticket ID, etc.) that the requestor 102 may use to subsequently inquire regarding the status of the request 106. In some instances, the request 106 may include multiple problems or issues reported by the requestor 102. For example, the requestor 102 may use the same request 106 to report a performance issue regarding a computer and to request permission to access particular table(s) in a database. In such instances, the preprocessing module(s) 110 may parse the request 106 to identify the multiple, separable problems and/or issues in the request. The multiple problems and/or issues may then be subsequently processed separately as described below, as if each separate problem or issue was reported in its own separate request 106.

Implementations support various types of requests 106 that are communicated using various methods. In some examples, the request 106 includes formatted or unformatted text data. For example, the request 106 may be an email that is sent using a protocol such as a version of IMAP, SMTP, POP, and/or any other suitable email protocol. In such instances, the preprocessing module(s) 110 may receive the request 106 by retrieving it from an email server and/or email inbox. In some examples, the request 106 may include text data that is entered by the requestor 102 through a web form or other type of form in user interface (UI) of a web application or other type of application. In such instances, the request 106 may also include metadata that describes the various fields into which the text data was entered in the form. The preprocessing module(s) 110 may receive the request 106 from front-end components of a web server, application server, or other software module(s) that provide the request 106 entered through the form. Implementations also support requests 106 provided as text data through other channels, such as messages and/or posts through a social network service, text messages sent using short message service (SMS), multimedia messaging service (MMS), and/or other messaging protocols, messages provided during an instant messaging (IM) and/or online chat session, and so forth. In such instances, the preprocessing module(s) 110 may receive the request 106 from a messaging service, social network service, IM service, and/or other appropriate service.

In some implementations, the request 106 is provided in the form of audio data. For example, the request 106 may include the recorded voice responses of the requestor 102 responding to queries of an interactive voice response (IVR) system, telephonic auto-attendant, virtual receptionist system, and so forth. As another example, the request 106 may be a voice mail and/or other recorded speech of the requestor 102. In instances where the request 106 includes audio data, the preprocessing module(s) 110 may receive the audio data of the request 106 from the IVR, voice mail, and/or other system that received the request 106 from the requestor 102. In some implementations, the preprocessing module(s) 110 initially process the audio data using a speech-to-text (STT) engine to generate a text data that is at least a partial transcript of the audio data.

In general, the request 106 may include any appropriate amount and/or format of data that includes text data, audio data, video data, image(s), metadata, and so forth. In some instances, the request 106 may be encrypted and/or compressed for communication to the preprocessing module(s) 110. In some instances, the request 106 may include metadata that describes the requestor 102 and/or the user device 104. For example, the metadata may include a name, user ID, or other information that describes the requestor 102. As another example, the metadata may include a description of the user device 104, including device type, model, operating system, installed and/or executing software, and/or other information regarding the hardware and/or software configuration of the user device 104. Such metadata may be incorporated into the ticket 120 as described below, or otherwise provided to the agent(s) 126 with other information regarding the request 106.

In some implementations, information provided in the request 106 may be used to retrieve or determine information regarding the requestor 102. For example, the request 106 may include an identifier of the requestor 102, such as a name, email address, user name, account name, customer ID, telephone number, social network account ID, and so forth. The identifier may be used to query a database of user information, such as customer information, to determine information such as a location of the requestor 102, a preferred natural language of the requestor 102, products and/or services acquired by the requestor 102, previous request(s) submitted by the requestor 102, the resolution of the previous request(s), and/or other information. Such information may be incorporated into the ticket 120 and/or otherwise used to process the request 106.

In some implementations, the preprocessing module(s) 110 may include a language determination module 112, a priority determination module 114, an automated response module 130, and/or a rules engine 132(1). The language determination module 112 may analyze the text data of the request 106 to determine the natural language(s) used in the request 106. For example, the language determination module 112 may determine whether the request 106 was provided in English, Mandarin, Spanish, Portuguese, Hindi, Turkish, and so forth. In some instances, the language determination module 112 may determine that multiple languages were used in the request 106, e.g., an email written partly in English and partly in Dutch. In some implementations, the language determination module 112 may identify instances where a request 106 is primarily in a particular language and includes word(s) and/or short phrase(s) from a second language. For example, if an email is written mostly in English but includes the non-English terms used conversationally and well understood by English speakers, such as the French phrase "bon appetite." The language determination module 112 may be configured to determine that the email uses English, but not French, as a natural language and includes the French phrase (e.g., as an aphorism) in a manner that is not significant for subsequent processing of the request 106.

The priority determination module 114 may analyze the request 106 to determine a priority 116 of the request 106. The priority 116 may indicate an urgency, importance, and/or criticality of the request 106 to the requestor 102 and/or the requestor's organization (e.g., business). In some instances, the priority 116 may be based on a potential impact of the problem or issue reported in the request 106, e.g., the potential impact on the requestor 102 and/or on the business or other organization. In some implementations, the priority 116 may be a value that is in a (e.g., continuous or discrete) range of possible values. For example, a high value may indicate a high priority, such that the issue is to be resolved expeditiously. A low value may indicate a low priority, such that the issue may wait for resolution until other higher priority issues are addressed. Priority 116 may be a numeric value, e.g., a number from 0 (e.g., low priority) to 4 (e.g., high priority). Priority 116 may be a descriptive value, e.g., "high", "medium", or "low" priority.

In some implementations, the priority determination module 114 may determine priority 116 by applying a set of (e.g., business) rules to the various word(s) and/or phrase(s) included in the text data of the request 106. For example, if a request 106 includes the text "network server down", the priority 116 may be designated as high given the potentially severe (e.g., business) impact of the issue on the organization's ability to function internally, service customers, and so forth. Priority can be determined based on the rules and/or based on the key metrics agreed to as part of one or more service level agreements (SLAs). In some instances, rule(s) may be applied by the rules engine 132(1) in addition to or instead of rule application using the priority determination module 114.

In some implementations, the priority 116 may be based at least partly on information regarding the requestor 102. In some examples, the preprocessing module(s) 110 may include a document integrator that analyzes the request 106 when it is received and that extracts information regarding the requestor 102 from various system(s). Such information may include a description of the requestor's position, job title, role within an organization, and so forth. In examples where the requestor 102 is a customer, the extracted information may include products and/or services purchased or used by the customer, and/or other previous transaction(s) of the customer. The extracted information may include a history of past interactions with the requestor 102, such as previous issues and/or problems reported by the requestor 102 and the resolution (if any) of the previously issues and/or problems. Predictive analytics, such as sentiment analysis algorithms, may operate to analyze the request 106 and determine an overall attitude and/or mood of requestor 102 based on the previous request(s) handled for the requestor 102, the language and/or tone used in the request

106, the previous ratings that the requestor 102 to rate previous handling of requests, and/or other information. Such analysis may predict the probability that the requestor 102 will be satisfied by the resolution of their request 106. The priority determination module 114 may determine priority 116 by applying any suitable number of rules to the text data of the request 106 and/or information regarding the requestor 102.

In some instances, the automated response module(s) 130 may automatically perform one or more actions in response to a request 106. In some implementations, the automated response module(s) 130 may employ robotic processing analysis (RPA) to identify and perform action(s) automatically. Such action(s) may include retrieving and sending information to the requestor 102. For example, in response to a request 106 that includes particular keywords and/or phrases, the automated response module(s) 130 may retrieve and send knowledge base information, troubleshooting guidelines, answers to frequently asked questions (FAQs), and/or other information relevant to the request 106. As another example, in a financial services environment the requestor 102 may request information such as account balances, transaction history, payment due (e.g., for loans, credit cards, etc.), and so forth, and the automated response module(s) 130 may automatically retrieve the requested information from the appropriate stored data and provide the information to the requestor 102. As another example, in a logistics management environment the requestor 102 may request information regarding a particular invoice, shipment, or other data object, and the automated response module(s) 130 may automatically retrieve the requested information from the appropriate stored data and provide the information to the requestor 102.

In some instances, the action(s) performed by the automated response module(s) 130 may include automated checks and/or verification of information included in the request 106. For example, if a new individual is joining an organization (e.g., a new employee), as indicated by a request 106, the automatic action(s) may include checking that a new user ID has been assigned to the new individual, checking that the ID is associated with the appropriate name of the individual, and so forth. In some instance, action(s) may include creating an account for a user, establishing the appropriate permissions on the account, creating credentials for authenticating the user, and so forth. In some examples, the action(s) taken may vary based on a geographic location of the requestor 102 and/or other individual associated with the request 106, and the action(s) may be taken according to a set of geography-based rules. The automated response module(s) 130 may access various systems to perform action(s). For example, the automated response module(s) 130 may call one or more application programming interfaces (APIs) and/or access other types of interface(s) to perform action(s).

In some implementations, the action(s) performed by the automated response module(s) 130 may be based at least partly on the priority 116 of the request 106. For example, if it is determined that the requestor 102 is angry, impatient, or otherwise agitated based on the content and/or tone of the request 106, automated action(s) may not be taken given that such action(s) may further agitate the requestor 102. In some instances, the action(s) performed may be based on the category of the request 106 that is determined as described further below. Some categories of requests 106 may not be appropriate for automated actions such as sending troubleshooting information.

In some implementations, the automated action(s) may be performed and the preprocessing module(s) 110 may wait to see if such action(s) resolved the issue reported in the request 106. If the action(s) did not lead to a resolution of the issue, the request 106 may be provided to the classification engine 118 for further handling as described below.

The classification engine 118 may receive the request 106 and the priority 116 from the preprocessing module(s) 110. The classification engine 118 may attempt to classify the request 106 by determining one or more categories that are relevant to the request 106. In some implementations, the classification engine 118 may employ a classification model 128 that is trained using one or more ML techniques. The training of the classification model 128 is described further with reference to FIG. 3. The use of the classification model 128 to determine one or more categories of a request 106 is described further with reference to FIG. 4.

The classification engine 118 may access a ticketing service 122 to generate a ticket 120 through the ticketing service 122. The ticket 120 may include the original request 106 (e.g., or text data from an audio request 106), the priority 116, and/or routing data 124 describing one or more categories that have been determined for the request 106. Through the ticketing service 122, the ticket 120 may be routed to one or more service agents 126 for further handling. For example, a request 106 with a particular category may be routed to an agent 126, or team of agents 126, that are specialized in handling that particular category of request 106. In some implementations, the ticketing service 122 may be a support ticket management system, issue tracking system, bug tracking system, customer support system, and so forth. In some implementations, the ticketing service 122 may be a communication engine that forwards the ticket 120 (e.g., as an email) to the appropriate agent(s) 126. Implementations support the use of any suitable file format for the ticket 120, including but not limited to: text formatted according to a version of the ASCII and/or Unicode standard; a version of Extensible Markup Language (XML); comma separated values (CSV); a spreadsheet format, such as a version of Microsoft Excel™; and so forth. The ticket 120 may be provided to agent(s) using a ticketing service 122 and/or independently of a ticketing service (e.g., through email or other messaging).

In some implementations, the classification engine 118 may access a rules engine 132(2) which applies one or more (e.g., business) rules to generate the ticket 120 in the ticketing service 122. In some implementations, the separate rules engine 132(2) may be omitted and the classification engine 118 may interact (e.g., directly) with the ticketing service 122.

The agent(s) 126 may perform various action(s) to attempt to resolve the problem or issue for the requestor 102. The agent(s) 126 may subsequently communicate the resolution (or lack thereof) to the requestor 102, and/or update the requestor 102 regarding the status of the issue as appropriate. In some instances, the agent(s) 126 may communicate with the requestor 102 to suggest possible solutions, request additional information regarding the issue, and/or for other purposes. In some implementations, the agent(s) 126 may update the ticketing service 122 with updates to the status of the request 106 and/or the eventual resolution of the request 106.

Figure 2:
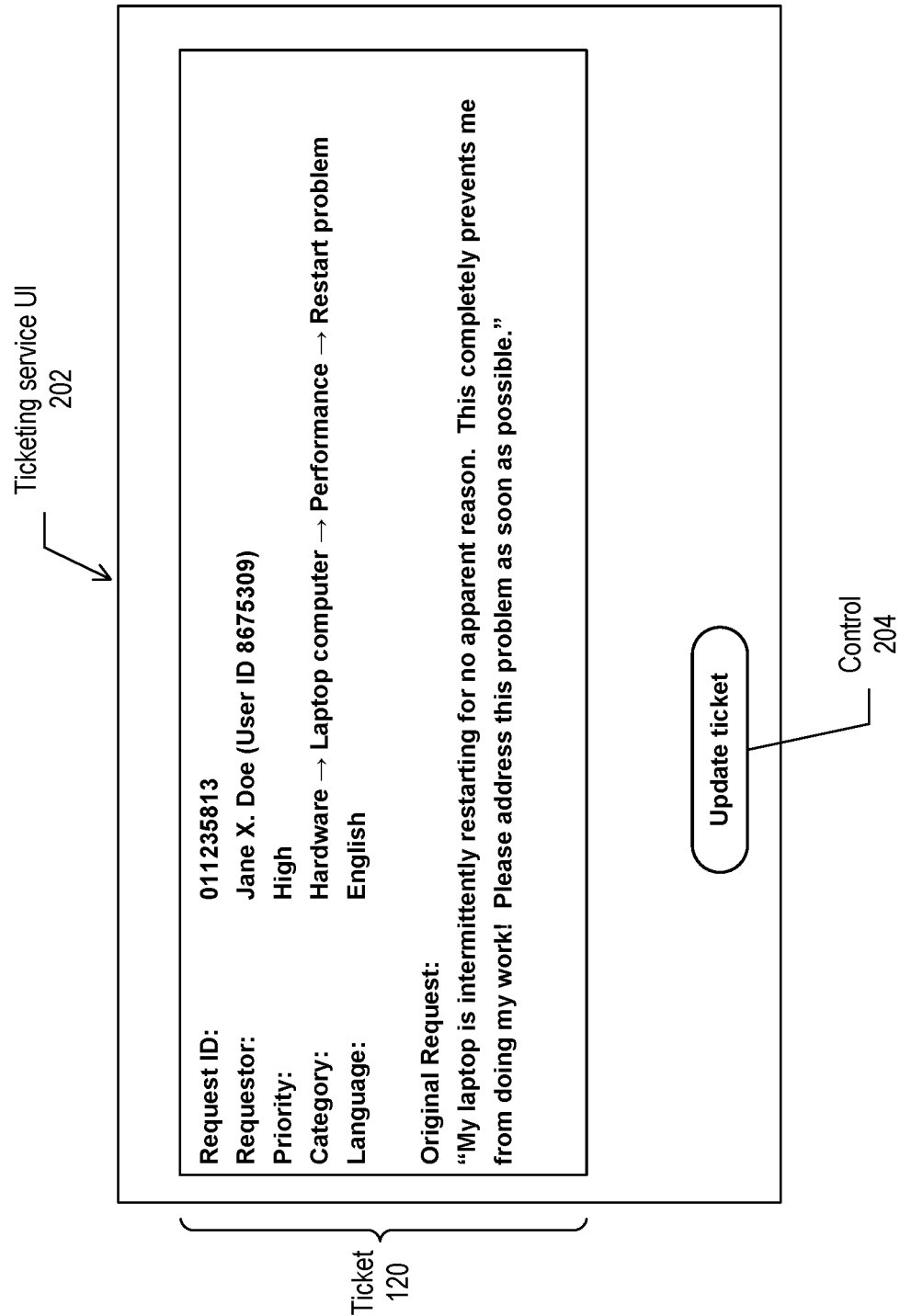
FIG. 2 depicts an example user interface, according to implementations of the present disclosure.

FIG. 2 depicts an example UI 202 of the ticketing service 122, according to implementations of the present disclosure. In the example of FIG. 2, the UI is presenting an example ticket 120 corresponding to a request 106. The ticket 120 may include a request ID that (e.g., uniquely) identifies the request 106. The ticket 120 may include a name, user ID, and/or other information describing the requestor 102 who submitted the request 106. The ticket 120 may indicate the priority 116 (e.g., "High" in this example). The ticket 120 may indicate a category corresponding to the routing data 124. For example, the ticket 120 may be routed to the appropriate agent(s) 126 based on the category of the ticket 120. The ticket 120 may also indicate the language(s) (e.g., English in this example) used to compose the request 106. In some instances, a ticket 120 and/or request 106 may be routed to agent(s) 126 who are proficient in the natural language(s) of the request 106. In instances where a request 106 includes multiple natural language(s), the request 106 may be routed to agent(s) 126 who are proficient in the language that is used more than other(s) in the request 106, or who are at least minimally proficient in each of the language(s) used in the request 106. In some instances, a mail may be sent automatically to the requestor asking the requestor to write the request (e.g., an email) in one of the supported languages (e.g., English) without including words from other languages.

The ticket 120 may also include at least a portion of the original request 106, e.g., "My laptop is intermittently restarting . . . ". In some implementations, the UI 202 may include one or more controls 204 and/or other UI elements that enable an agent 126 to update the ticket 120 with additional information and/or edits.

In some example of FIG. 2, the priority 116 of the request 106 has been set to "High" to indicate that the resolution of the request 106 takes priority over other, lower priority requests. In some instances, the priority 116 may be based on language used in the request 106, as described above. For example, the request 106 shown in FIG. 2 includes language and/or punctuation that indicates an urgency or importance of the request, such as "completely prevents me", "as soon as possible", and the exclamation point at the end of the second sentence of the request 106. The priority 116 may also be based on other criteria as described above, such as the impact of the problem on the organization (e.g., business) or the requestor 102, the role of the requestor 102 in an organization, and so forth.

In some implementations, the category of a request 106 and/or ticket 120 may include one or more categories and/or subcategories within a hierarchy of categories and subcategories. The category may include any suitable number of categories and/or subcategories that are hierarchically arranged from less specific to more specific. In the example of FIG. 2, the issue is related to intermittent restarts of a laptop computer. Accordingly, the category includes the general category of "Hardware" as well as progressively more specific subcategories of "Laptop computer", "Performance", and "Restart problem". A hierarchical arrangement of categories may enable implementations to route a ticket 120 to a particular agent 126 or team of agents 126 who may specialize in solving problems of a specific type. For example, the ticket 120 shown in FIG. 2 may be routed to agent(s) 126 who have particular knowledge, expertise, and/or experience in solving restart problems in laptop computers. If such agent(s) 126 are not available, the ticket 120 may be routed according to the less specific categories, e.g., to agent(s) 126 that are suitable for solving problems related to laptop performance, laptop computers, and/or computer hardware generally.

Although FIG. 2 depicts an example UI with particular UI elements (e.g., controls, text, frames, etc.) presented in a particular arrangement, implementations are not limited to this example. Implementations may provide a UI that includes any suitable number and type of UI elements such as controls, text, graphics, images, video, audio, frames, dynamic elements, static elements, and/or other UI element(s). The UI may include any suitable number of pages, windows, and/or other containers for presenting the UI elements.

Figure 3:
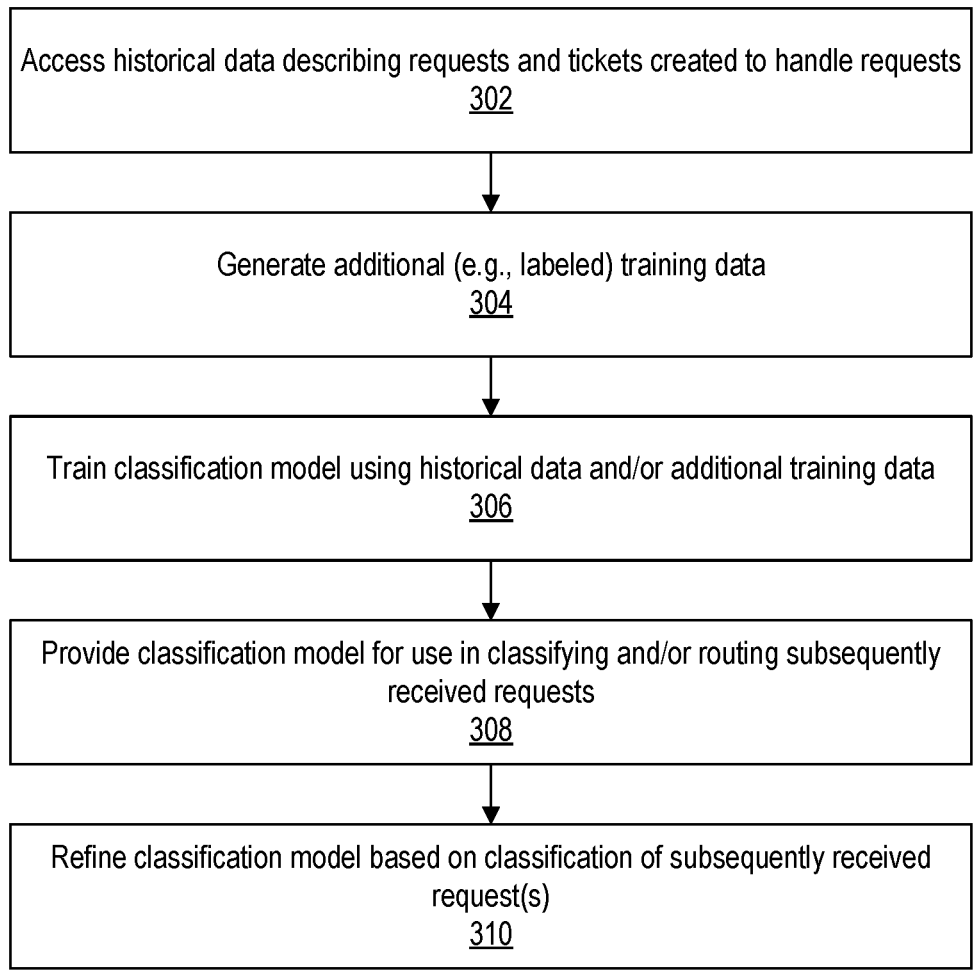
FIG. 3 depicts a flow diagram of an example process for training a classification model for routing service requests in a service environment, according to implementations of the present disclosure.

FIG. 3 depicts a flow diagram of an example process for training a classification model for routing service requests in a service environment, according to implementations of the present disclosure. Operations of the process may be performed by one or more of the preprocessing module(s) 110, the language determination module 112, the priority determination module 114, the automated response module(s) 130, the classification engine 118, the ticketing service 122, and/or other software module(s) executing on the service management device(s) 108, the user device 104, or elsewhere.

Historical data may be accessed (302), the historical data describing past requests, tickets created to handle the past requests, and/or the resolution of the past requests. The historical data may include, for one or more requests, the text included in the request and the one or more categories into which the request was classified. In some implementations, a particular time period worth of historical data may be accessed, such as data for the past six months or one year. In some implementations, additional training data may be generated (304). Such data may be generated through manual labeling of request(s) with category information. In some implementations, additional training data may be generated by applying a set of rules to the text data in the request(s). For example, a request that includes the terms "laptop" or "laptop computer" may be labeled with a "computer hardware" and/or "laptop computer" category.

The classification model 128 may be trained (306) or otherwise determined using the historical data and/or additional training data. The classification model 128 may be stored and provided (308) for use in classifying subsequently received requests 106 into the appropriate categories, which may then be used in routing the requests 106 for handling by the appropriate agent(s) 126.

In some implementations, the classification model 128 may be refined (310) and/or otherwise modified based on the use (e.g., success or failure) of the model to classify particular requests. For example, if a request 106 is appropriately classified into a category, appropriately routed to the suitable agent(s) 126, and/or resolved in a timely and/or successful manner, the category classification of the request may be designated as positive training data that is used to further train and/or refine the performance of the model. If a request is inappropriately classified into a (e.g., wrong) category, routed to the wrong agent(s) 126, and/or not resolved or unsatisfactorily resolved, the category classification of the request may be designated as wrongly classified data. Such data may be used to further train and/or refine the model to more appropriately classify subsequently received requests that include similar text to the wrongly classified data. In some examples, a determination whether a particular request was resolved satisfactorily or unsatisfactorily may be based on whether the resolution complies or fails to comply with a service level agreement (SLA) or other quality-of-service metric(s) related to the timeliness of the resolution, the satisfaction of the requestor, occurrence or non-occurrence of follow-up requests by the requestor, and/or other considerations.

Implementations support the use of any suitable number and type of ML algorithms to train the classification model 128. Such algorithm(s) may include supervised, unsupervised, and/or reinforcement ML algorithms. The ML algorithm(s) may include but are not limited to one or more of the following: classification algorithms such as decision trees, logistic regression, neural networks, support vector machines (SVMs), deep learning algorithms such as stacked autoencoders, association rule learning, inductive logic programming, dictionary-based learning, representation learning, and so forth.

Figure 4:
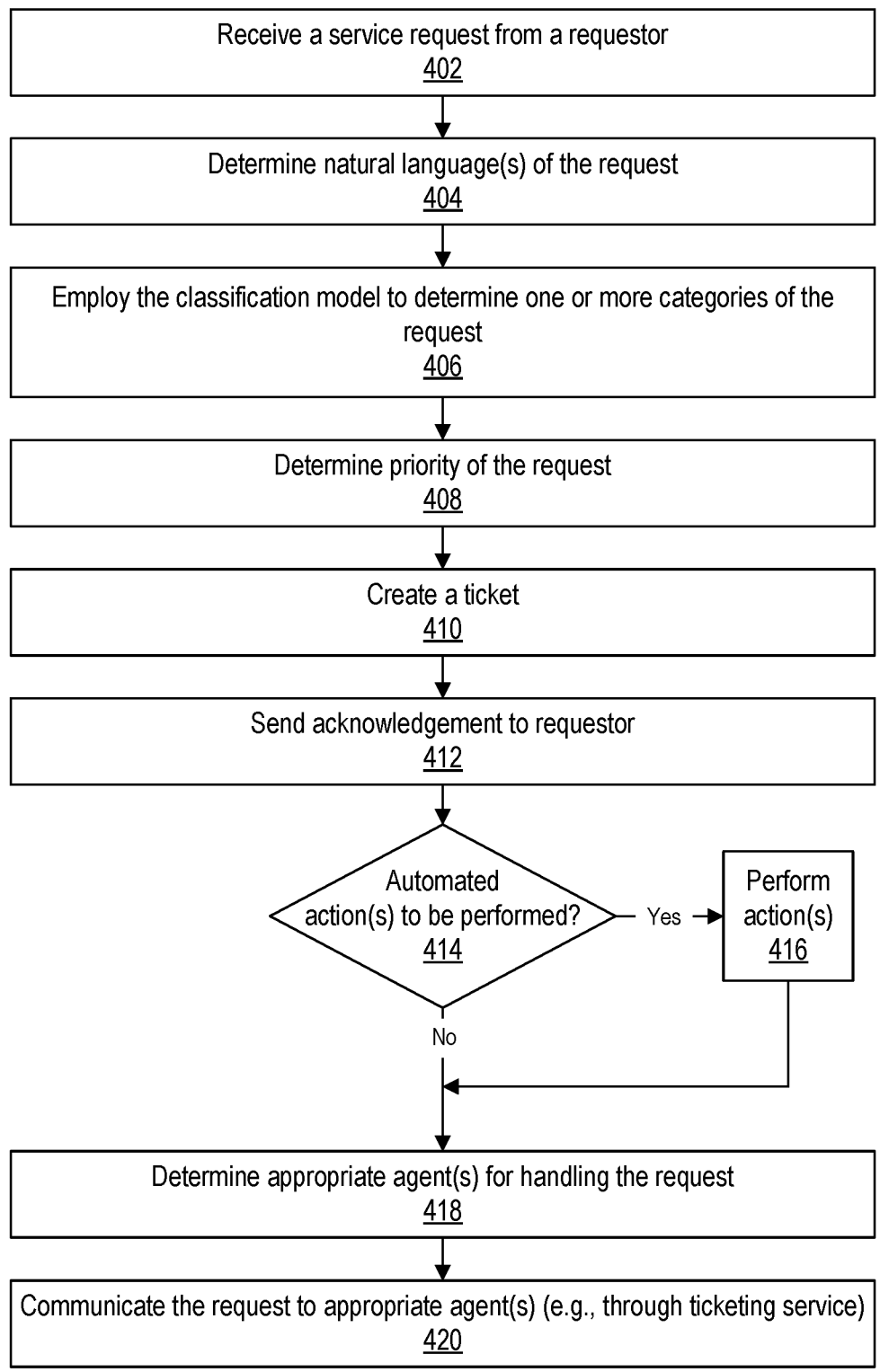
FIG. 4 depicts a flow diagram of an example process for routing service requests in a service environment, according to implementations of the present disclosure.

FIG. 4 depicts a flow diagram of an example process for routing service requests in a service environment, according to implementations of the present disclosure. Operations of the process may be performed by one or more of the preprocessing module(s) 110, the language determination module 112, the priority determination module 114, the automated response module(s) 130, the classification engine 118, the ticketing service 122, the rules engine 132(1), the rules engine 132(2), and/or other software module(s) executing on the service management device(s) 108, the user device 104, or elsewhere.

A request 106 may be received (402) from a requestor 102, as described above. The request 106 may include text data, such as the body and/or subject of an email, contents of an IM or chat session, contents of a text message, text entered by the requestor 102 through a (e.g., web) form, and so forth. In some instances, the request 106 may include audio data such as a recording of the requestor's voice made through a voice mail system, IVR system, or other audio capture system. In such instances, the audio data may be analyzed using STT technique(s) to generate the text data of the request 106.

In some implementations, the request 106 may be analyzed to determine (404) one or more natural languages present in the text data of the request 106, such as Korean, French, Thai, English, Spanish, and so forth. In some implementations, the request 106 may be at least partially translated (e.g., automatically) to another language prior to further processing of the request 106. For example, in instances where a request 106 is in a language other than English, the request 106 may be at least partially translated into English using any suitable automated translation technique.

The classification model 128 may be employed (406) to determine one or more categories of the request 106.

The priority 116 of the request 106 may be determined (408). As described above, the priority 116 may be determined through the application of one or more (e.g., business) rules to the text data of the request 106 and/or information regarding the requestor 102.

In some implementations, a ticket 120 may be created (410) in the ticketing service 122, as described above. The ticket 120 may be created with a ticket ID that identifies the ticket 120.

An acknowledgement may be sent (412) to the requestor 102. In some instances, the acknowledgement may include the ticket ID, an issue ID, and/or a request ID that the requestor 102 may use to identify the request 106 in subsequent communications. The acknowledgement may be sent in an email or through some other communication channel. In some instances, the acknowledgement may be written in a natural language that was included in the received request 106.

A determination may be made (414) whether one or more automated actions are to be performed by the automated response module(s) 130 in response to the request 106. If so, one or more actions may be performed (416). As described above, such action(s) may include retrieving and sending information to the requestor 102 such as troubleshooting information, answers to FAQs, knowledge base article(s), requested invoice and/or account information, and so forth. The action(s) may also include RPA action(s) to create and/or verify account information, provision a new user ID, and so forth. In some instances, the action(s) may not be performed if the priority 116 is high. For example, if a request 106 is urgent and/or the requestor's mood is agitated or impatient, the automated sending of troubleshooting information to the requestor 102 may cause an undesirable delay in eventual resolution and/or further agitation of the requestor 102.

After the automated action(s) are performed, or if no automated action(s) are to be performed at this stage, one or more appropriate agents 126 may be determined (418) for handling the request 106, e.g., for investigating and possibly resolving the issues and/or problems described in the request 106. The request 106 may then be communicated (420) (e.g., routed), based on the category information, to the appropriate agent(s) 126 for investigation and/or resolution. As described above, in some examples the routing may be through a ticket 120 in a ticketing service 122.

In some implementations, if automated action(s) are performed (e.g., 416) the further classification and routing of the request 106 may be delayed pending an outcome of the automated action(s). For example, if the requestor 102 indicates that they were able to solve an issue based on automatically provided troubleshooting information, the request 106 may be closed and not routed to agent(s) 126 for further handling. In instances where the issue was not resolved through automated action(s), the automated action(s) may lead to the collection of additional data regarding the issue. For example, the requestor 102 may attempt various operations described in troubleshooting information. If such operations do not resolve an issue, the requestor 102 may send screen shots and/or other descriptive information regarding the unsuccessful attempt to resolve the issue. Such additional data may be added to the ticket 120 or otherwise provided to the agent(s) 126 to help them analyze the issue.

In some instances, the processing of a request 106 may be based at least partly on the natural language(s) used in the request 106. In some implementations, a language-specific classification engine 118 and/or classification model 128 may be used to classify the request 106. For example, request(s) 106 in English may be handled by a classification engine 118 that employs an English-trained classification model 128, whereas request(s) 106 in Spanish may be handled by a classification engine 118 that employs a Spanish based NLP module to train the classification model 128. In some instances, the request 106 may be routed to agent(s) 126 who are proficient in the natural language(s) of the request 106.

Figure 5:
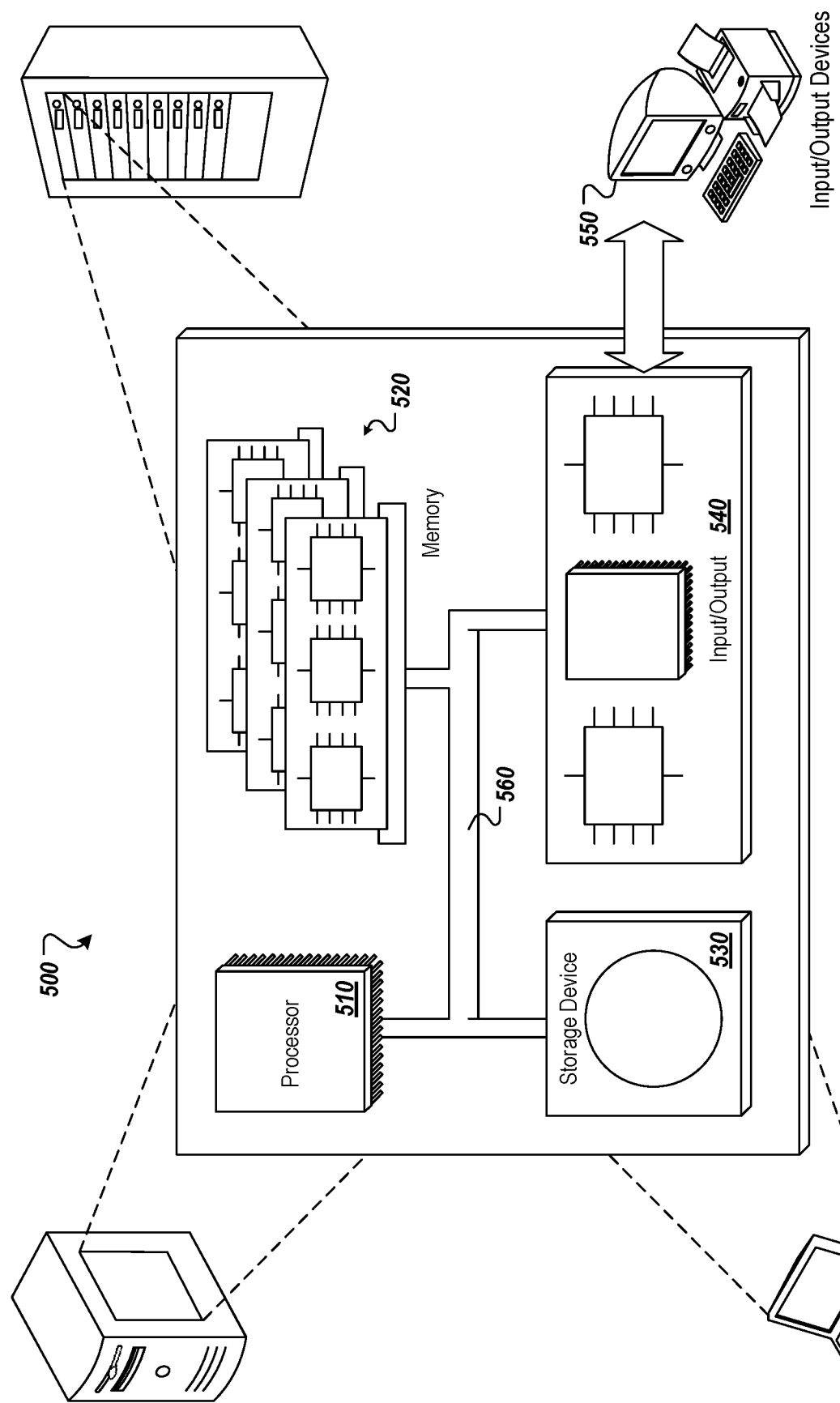
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the user device 104, the service management device(s) 108, and/or other computing device(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for routing a request in a service environment, the method being performed by at least one processor, the method comprising:
   receiving, by the at least one processor, the request that indicates an issue to be resolved;
   determining, by the at least one processor, at least one category of the request by applying a classification model to text data of the request, the classification model developed using at least one machine learning (ML) algorithm, the at least one category included in a hierarchy of categories; and
   determining that an agent corresponding to the at least one category is unavailable to address the request, and in response:
      selecting a category within the hierarchy of categories that is less specific than the at least one category;
      determining, by the at least one processor, at least one agent for resolving the issue, the at least one agent determined based at least partly on the category selected within the hierarchy of categories; and
      communicating, by the at least one processor, the request to the at least one agent.

2. The method of claim 1, further comprising:
   performing, by the at least one processor, at least one action in response to the request, the at least one action determined by applying at least one rule to the text data of the request.

3. The method of claim 1, further comprising:
   determining, by the at least one processor, a priority of the request based at least partly on the text data of the request; and
   communicating, by the at least one processor, the priority of the request to the at least one agent.

4. The method of claim 3, wherein the priority is further based on at least one characteristic of a requestor who submitted the request.

5. The method of claim 3, further comprising:
   conditionally performing, by the at least one processor, at least one action in response to the request based at least partly on the priority of the request, the at least one action determined by applying at least one rule to the text data of the request.

6. The method of claim 1, wherein:
   the request is received as one or more of an email, a text message, or form data; and
   the text data is included in the request.

7. The method of claim 1, wherein:
   the request is received as audio data; and
   the text data is generated by applying speech-to-text (STT) analysis to the audio data.

8. The method of claim 1, further comprising:
   determining, by the at least one processor, at least one natural language of the request;
   wherein the at least one agent is determined further based on the at least one natural language.

9. The method of claim 1, further comprising:
   providing, by the at least one processor, historical data including previous requests and at least one category determined for each of the previous requests; and
   developing, by the at least one processor, the classification model using the historical data through application of the at least one ML algorithm.

10. The method of claim 1, wherein the classification model is further developed using Natural Language Processing.

11. A system, comprising:
    at least one processor; and
    a memory communicatively coupled to the at least one processor, the memory storing instructions which, when executed by the at least one processor, cause the at least one processor to perform operations comprising:
       receiving a request that indicates an issue to be resolved;
       determining at least one category of the request by applying a classification model to text data of the request, the classification model developed using at least one machine learning (ML) algorithm, the at least one category included in a hierarchy of categories; and
       determining that an agent corresponding to the at least one category is unavailable to address the request, and in response:
          selecting a category within the hierarchy of categories that is less specific than the at least one category;
          determining at least one agent for resolving the issue, the at least one agent determined based at least partly on the category selected within the hierarchy of categories; and
          communicating the request to the at least one agent.

12. The system of claim 11, the operations further comprising:
    performing at least one action in response to the request, the at least one action determined by applying at least one rule to the text data of the request.

13. The system of claim 11, the operations further comprising:
    determining a priority of the request based at least partly on the text data of the request; and
    communicating the priority of the request to the at least one agent.

14. The system of claim 13, wherein the priority is further based on at least one characteristic of a requestor who submitted the request.

15. The system of claim 13, the operations further comprising:
    conditionally performing at least one action in response to the request based at least partly on the priority of the request, the at least one action determined by applying at least one rule to the text data of the request.

16. One or more non-transitory computer-readable storage media storing instructions which, when executed by at least one processor, cause the at least one processor to perform operations comprising:
    receiving a request that indicates an issue to be resolved;
    determining at least one category of the request by applying a classification model to text data of the request, the classification model developed using at least one machine learning (ML) algorithm, the at least one category included in a hierarchy of categories; and determining that an agent corresponding to the at least one category is unavailable to address the request, and in response:

selecting a category within the hierarchy of categories that is less specific than the at least one category;

determining at least one agent for resolving the issue, the at least one agent determined based at least partly on the category selected within the hierarchy of categories; and communicating the request to the at least one agent.

17. The one or more non-transitory computer-readable storage media of claim 16, wherein:

the request is received as one or more of an email, a text message, or form data; and the text data is included in the request.

18. The one or more non-transitory computer-readable storage media of claim 16, wherein:

the request is received as audio data; and the text data is generated by applying speech-to-text (STT) analysis to the audio data.

19. The one or more non-transitory computer-readable storage media of claim 16, the operations further comprising:

determining, by the at least one processor, at least one natural language of the request;

wherein the at least one agent is determined further based on the at least one natural language.

20. The one or more non-transitory computer-readable storage media of claim 16, the operations further comprising:

providing, by the at least one processor, historical data including previous requests and at least one category determined for each of the previous requests; and developing, by the at least one processor, the classification model using the historical data through application of the at least one ML algorithm.

* * * * *